United States Patent [19]

Liska et al.

[11] Patent Number: 5,798,626
[45] Date of Patent: Aug. 25, 1998

[54] SERVO MOTOR CONTROL

[75] Inventors: Timothy J. Liska, W. Simsbury, Conn.; Kevin Moriarty, Hampden, Mass.; Joseph T. Ferrigno, Manchester, Conn.

[73] Assignee: Emhart Glass Machinery Investments Inc., Wilmington, Del.

[21] Appl. No.: 694,883

[22] Filed: Aug. 9, 1996

[51] Int. Cl.$^6$ .................................................. G05B 11/32
[52] U.S. Cl. ........................................... 318/562; 318/590
[58] Field of Search ................................ 318/625, 562, 318/567, 85, 34, 41, 112, 568.1–574, 677, 590–610

[56] References Cited

U.S. PATENT DOCUMENTS

| | | | |
|---|---|---|---|
| 4,257,103 | 3/1981 | Suzuki et al. | 364/474.11 |
| 4,829,219 | 5/1989 | Penkar | 318/568.18 |
| 4,847,779 | 7/1989 | Masao et al. | 364/475.05 |
| 5,028,855 | 7/1991 | Distler et al. | 364/474.29 |
| 5,043,645 | 8/1991 | Miyata et al. | 318/571 |
| 5,057,755 | 10/1991 | Naka | 318/568.1 |
| 5,194,790 | 3/1993 | Niimi | 318/567 |
| 5,202,611 | 4/1993 | Uehara et al. | 318/85 |
| 5,237,250 | 8/1993 | Zeile et al. | 318/562 |
| 5,239,102 | 8/1993 | Webb et al. | 556/472 |
| 5,254,923 | 10/1993 | Kanitani | 318/568.11 |

*Primary Examiner*—Brian Sircus
*Attorney, Agent, or Firm*—Spencer T. Smith

[57] ABSTRACT

An amplifier circuit which communicates over a two way bus with a CPU having a profile generating computer for defining at least one profile and which supplies a control signal to a motor. The amplifier circuit has a profile generating computer for generating at least one profile which has been downloaded from the CPU and a motor controller for receiving the profile and for issuing a control signal for the motor.

3 Claims, 1 Drawing Sheet

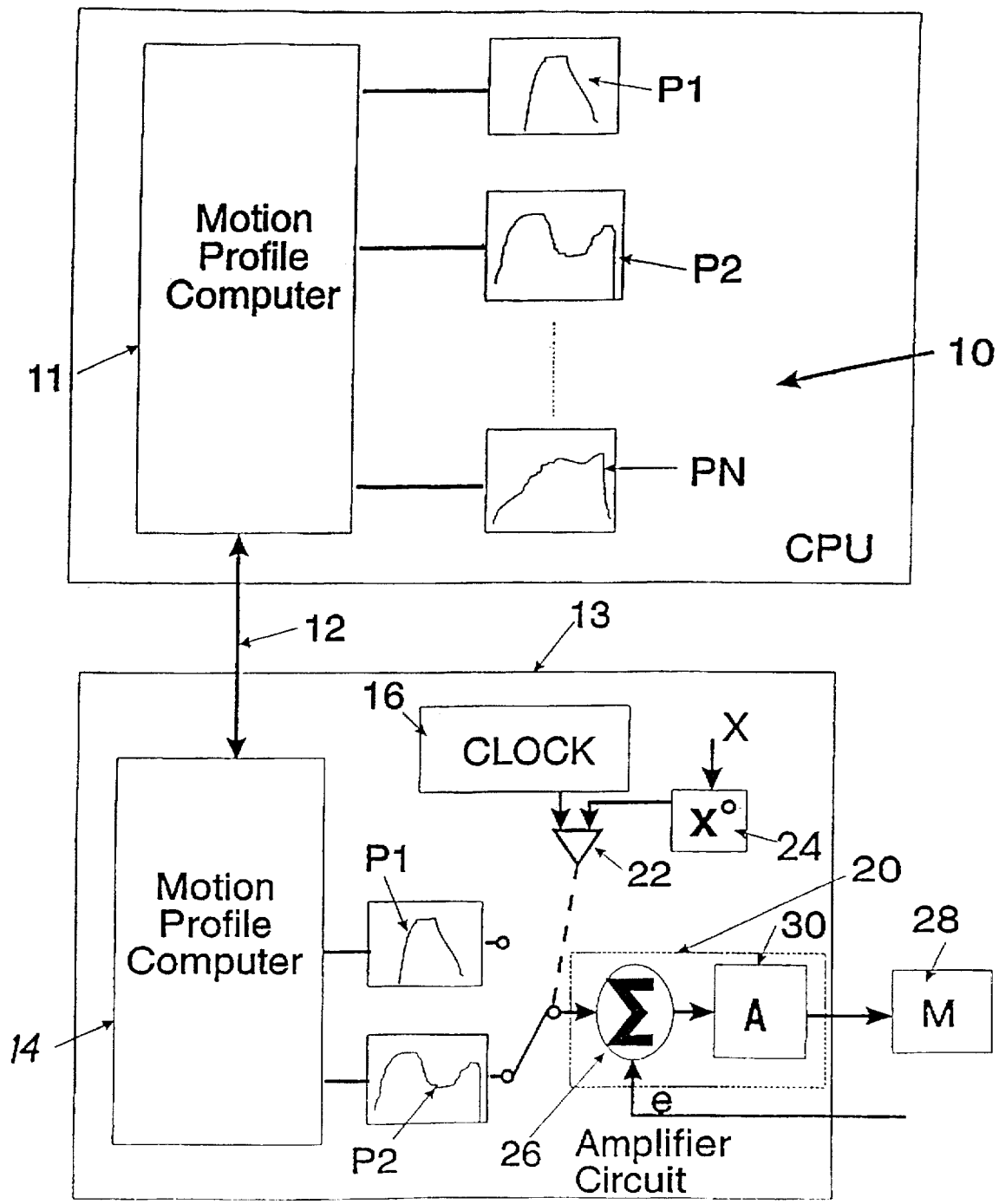

SERVO MOTOR CONTROL

The present invention relates to motors and more particularly to controls for such motors.

State of the art control systems for motors generally include an amplifier circuit which supplies a signal to the motor. The amplifier circuit, where the motor is a servo motor, has a summing circuit which sums a demand signal and a position feedback signal and supplies the summed signal to a motor controller. The analog output of the motor controller is supplied to the servo motor. The demand signal is defined by a profile generator which is located in a CPU. When stepping motors are driven similar profiles, defined in a CPU, are supplied to an amplifier circuit which supplies pulses to the stepping motor. Such control systems are extremely expensive.

It is accordingly an object of the present invention to define a motor control system which will have a greatly reduced cost.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawing:

The sole FIGURE is an electronic schematic illustrating a control system for a motor made in accordance with the teachings of the present invention.

A central processing unit (CPU) 10 has a Motion Profile Computer 11 for generating a plurality of motion profiles P1, P2, . . . PN. These profiles can be time dependent or time independent and can represent displacement, velocity, acceleration or torque, for example. Connected to the CPU by a suitable two way bus 12 is an amplifier circuit 13 which has a Motion Profile Computer 14. The motion profiles in the Motion Profile Computer 11 of the CPU 10 can be downloaded to the Motion Profile Computer 14 in the amplifier circuit 13. The Motion Profile Computer 14 in the amplifier circuit 13 can simultaneously clock a pair of profiles P1, P2. A clock 16 which can be located within the amplifier circuit or external to it, clocks these profiles. An electronic switch 18 can be operated to supply the clocked profile from one of the two simultaneously clocked profiles (demand signal D) to a motor controller 20. As illustrated, a comparator 22 which compares the signal from the clock 16 to a selected setting (X°) of a set point device 24 will effect a switch from one profile to the other profile at this set point. This set point (X°) can be set from the CPU. Where the motor is a servo motor, the motor controller will include a summing device 26 which sums the clocked demand signal D and an error signal E which is received from a transducer (linear or rotational) which tracks the position of the motor 28 or an object displaced by the motor and outputs a signal to an amplifier 30 which supplies an analog voltage signal to the motor 28.

When it is not desired to switch from one profile to a second profile during a clocked cycle or where the Motion Profile Computer of the amplifier circuit outputs a single profile, the switch can be disabled.

Where the motor is a stepping motor operating open loop, there will be no summing circuit since there will not be an error signal and the output of the amplifier will be a series of pulses.

What is claimed is:

1. An amplifier circuit for supplying a control signal to a motor comprising a first profile generating computer for simultaneously clocking at least two profiles, a motor controller for supplying a control signal to the motor, and switch means displaceable from a first position for supplying one of said profiles to said motor controller while said profile generating computer continues to clock the second profile to a second position for supplying a second one of said profiles to said motor controller while said profile generating computer continues to clock the first profile.

2. An amplifier circuit for supplying a control signal to a motor according to claim 1, further comprising means for issuing a set point signal, clock means for issuing a clock signal, means for comparing said clock signal with said set point signal, and means for switching said switch from said first position to said second position when said clock signal exceeds said set point signal.

3. An amplifier circuit for supplying a control signal to a motor according to claim 2, further comprising a CPU having a second profile generating computer for defining a plurality of profiles, and a two way bus communicating between said second profile generating computer and said second profile generating means.

* * * * *